(12) United States Patent
Chembrolu

(10) Patent No.: US 9,036,299 B2
(45) Date of Patent: May 19, 2015

(54) MAGNETIC WRITE HEAD HAVING A RECESSED HIGH MOMENT PORTION OF THE WRAP-AROUND SHIELD

(71) Applicant: HGST Netherlands B.V., Amsterdam (NL)

(72) Inventor: Venkatesh Chembrolu, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/950,011

(22) Filed: Jul. 24, 2013

(65) Prior Publication Data

US 2015/0029615 A1    Jan. 29, 2015

(51) Int. Cl.
  *G11B 5/31*    (2006.01)
  *G11B 5/11*    (2006.01)
(52) U.S. Cl.
  CPC ........................................ *G11B 5/11* (2013.01)
(58) Field of Classification Search
  USPC ...................................................... 360/125.3
  See application file for complete search history.

(56) References Cited

U.S. PATENT DOCUMENTS

| | | | |
|---|---|---|---|
| 5,490,021 A * | 2/1996 | Muller et al. ............... | 360/98.07 |
| 7,788,798 B2 * | 9/2010 | Guthrie et al. ............. | 29/603.16 |
| 7,804,662 B2 | 9/2010 | Chen et al. | |
| 8,054,586 B2 | 11/2011 | Balamane et al. | |
| 8,120,874 B2 | 2/2012 | Hsiao et al. | |
| 8,169,730 B2 | 5/2012 | Cheng et al. | |
| 8,186,040 B2 * | 5/2012 | Baer et al. .................. | 29/603.16 |
| 8,209,848 B2 | 7/2012 | Bai et al. | |
| 8,300,355 B2 * | 10/2012 | Yang .......................... | 360/99.08 |
| 8,400,733 B2 | 3/2013 | Shin et al. | |
| 8,411,384 B2 | 4/2013 | Mochizuki et al. | |
| 8,441,757 B2 * | 5/2013 | Chen et al. ................ | 360/125.13 |
| 8,582,238 B1 * | 11/2013 | Liu et al. ..................... | 360/125.3 |
| 8,619,391 B2 * | 12/2013 | Hsu et al. .................... | 360/125.3 |
| 8,720,044 B1 * | 5/2014 | Tran et al. .................. | 29/603.14 |
| 2011/0097601 A1 | 4/2011 | Bai et al. | |
| 2012/0026628 A1 | 2/2012 | Li et al. | |
| 2012/0125885 A1 | 5/2012 | Chen et al. | |

OTHER PUBLICATIONS

"High-density Perpendicular Magnetic Recording Technology", Hitachi Technology 2009-2010, Research & Development, 2009, p. 79.

* cited by examiner

*Primary Examiner* — Mark Blouin
(74) *Attorney, Agent, or Firm* — John D. Henkhaus

(57) ABSTRACT

Approaches to improving hard disk drive far track interference problems include utilizing a wrap-around shield having recessed high magnetic moment layer(s). Embodiments include tapering the high-moment portion away from the air bearing surface (ABS) in the cross-track direction away from the write pole, thereby reducing exposure of high moment layers at the ABS to reduce the risk of unwanted track erasure away from the main pole. Embodiments include positioning the high magnetic moment layers in their entirety away from the ABS, such as with a laminate structure of high magnetic moment and low magnetic moment materials laid down in a direction away from the pole tip trailing edge.

20 Claims, 5 Drawing Sheets

VIEW A-A

MAGNETIC WRITE HEAD HAVING A RECESSED HIGH MOMENT PORTION OF THE WRAP-AROUND SHIELD

FIELD OF THE INVENTION

Embodiments of the invention relate generally to perpendicular magnetic recording and more particularly to improving far track interference performance.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator.

A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

A perpendicular magnetic recording (PMR) system records data as magnetizations oriented perpendicular to the plane of the magnetic-recording disk. The magnetic disk has a magnetically soft underlayer covered by a thin magnetically hard top layer. The perpendicular write head has a main pole with a very small cross section at the pole tip, tapered down from the cross section along the length of the yoke from which the pole tip protrudes, and a return pole having a much larger cross section along the length. A write head may also include a wrap-around shield for assisting in focusing the magnetic field emitting from the pole tip by managing the magnetic leakage from the pole tip, and a back gap. A strong, highly concentrated magnetic field emits from the writer main pole in a direction perpendicular to the magnetic disk surface, magnetizing the magnetically hard top layer of the disk. The resulting magnetic flux then travels through the soft underlayer of the magnetic disk, returning to the return pole where it is sufficiently spread out and weak that it will not erase the signal recorded by the main pole when it passes back through the magnetically hard top layer of the disk on its way back to the return pole.

However, there remains a risk associated with a write operation, that the highly concentrated magnetic field emitted from the writer main pole tip will interfere with the data integrity of adjacent tracks (referred to as "adjacent track interference", or "ATI") and tracks beyond adjacent (referred to as "far track interference", or "FTI"), typically manifesting as soft errors. Because a significant amount of magnetic flux is generated in the relatively wide cross section main pole and channeled into the very small cross section pole tip, magnetic leakage occurs which can cause ATI and FTI. While there are teams of scientists and engineers designing solutions to reduce such leakage, a couple general approaches to this issue are to optimize the design of the main pole (e.g., the geometry, the flare point, etc.) and, as mentioned, to utilize a wrap-around shield ("WAS") to "catch" and redirect the flux leakage. A WAS is typically positioned at and wrapping around the main pole tip, and is constructed of magnetic material having a lower magnetic moment than the main pole material.

SUMMARY OF EMBODIMENTS OF THE INVENTION

Embodiments of the invention are directed to improving hard disk drive (HDD) far track interference (FTI) problems by utilizing a wrap-around shield (WAS) having recessed high magnetic moment layer(s).

Embodiments include tapering the high-moment portion of the WAS away from the air bearing surface (ABS) in the cross-track direction away from the write pole, thereby reducing exposure of high-moment layers at the ABS to reduce the risk of unwanted track erasure away from the main pole.

Embodiments include positioning the high-moment layers in their entirety away from the ABS, such as with a monolithic high-moment structure leading away from the main pole tip trailing edge side or with a laminate structure of high-moment and low-moment materials laid down in a direction away from the pole tip trailing edge.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a recessed wrap-around shield in a magnetic write head, with applicability to incorporation into a hard disk drive, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
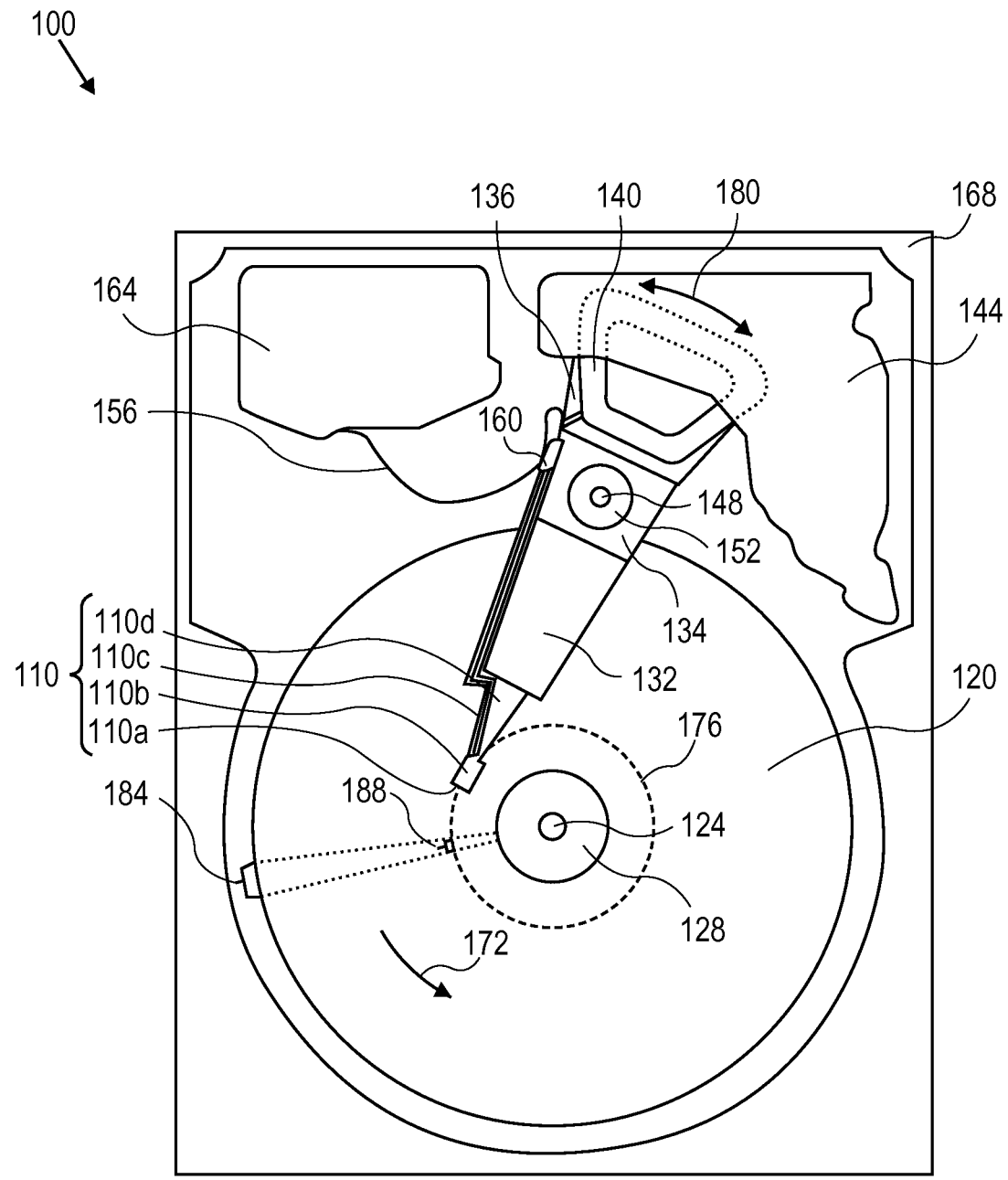
FIG. 1 is a plan view of a hard disk drive (HDD), according to an embodiment of the invention.

Embodiments of the invention may be used in the context of a magnetic writer for a hard-disk drive (HDD). In accordance with an embodiment of the invention, a plan view of a HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording disk 120 rotatably mounted on a spindle 124 and a drive motor (not visible) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the disk 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of stacked tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Figure 2:
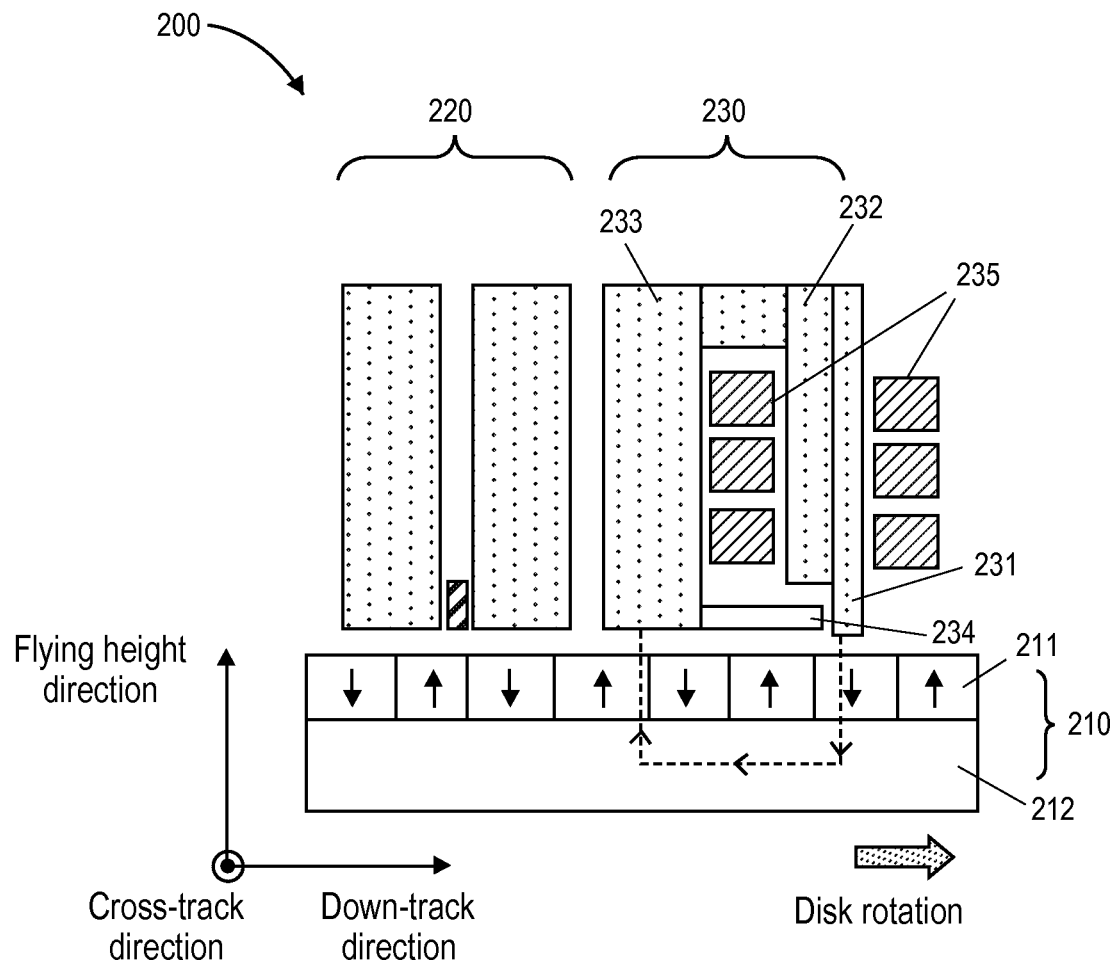
FIG. 2 is a cross-sectional side view of a perpendicular magnetic recording head, according to an embodiment of the invention.

FIG. 2 is a cross-sectional side of a perpendicular magnetic recording (PMR) head, according to an embodiment of the invention. FIG. 2 illustrates a PMR head 200 in recording relation with a perpendicular magnetic recording medium such as disk 210. PMR head 200 comprises a reader 220 and a writer 230.

PMR writer 230 comprises a main pole 231, an auxiliary pole 232 (also at times referred to as a "stitch pole"), a writer coil 235, a magnetic wrap-around shield (WAS) 234, and a return pole 233. Main pole 231 is exposed at the air bearing surface (ABS), faces disk 210, and forms recording bits by reversing the magnetization of magnetic particles in the disk 210. Auxiliary pole 232 is magnetically connected to the main pole 231 but is not typically exposed at the ABS. Writer coil 235 is for exciting the main pole 231 and the auxiliary pole 232, i.e., the electricity flowing through the coil 235 produces a magnetic field. The WAS 234 is positioned at the periphery of the main pole 231 tip for assisting with focusing the magnetic flux emitting from main pole 231, and a return pole 233 is positioned for providing means for the magnetic flux to return to the writer structure to complete the magnetic circuit.

As mentioned, electrical pulses are sent to the coil 235 of writer 230 with different patterns of positive and negative currents and the current in the coil 235 induces a magnetic field across the gap between the main pole 231 and the disk 210, which in turn magnetizes a small area on the recording medium. A strong, highly concentrated magnetic field emits from the main pole 231 in a direction perpendicular to the 210 disk surface, magnetizing the magnetically hard top layer 211. The resulting magnetic flux then travels through the soft underlayer 212, returning to the return pole 233 where it is sufficiently spread out and weak that it will not erase the signal recorded by the main pole 231 when it passes back through the magnetically hard top layer 211 on its way back to the return pole 233.

Magnetic Write Head with a Recessed Wrap-Around Shield

As mentioned, a risk associated with write operations in a hard disk drive (HDD) is that the highly concentrated magnetic field emitted from the writer main pole tip will interfere with the data integrity of adjacent tracks and/or tracks beyond adjacent ("far track interference", or "FTI"). While the known approaches to this issue are to optimize the design of the main pole and to implement a wrap-around shield ("WAS") to control the flux leakage, challenges still remain with combating FTI. Therefore, embodiments of the invention are directed to improving HDD FTI problems by utilizing a WAS having recessed high magnetic moment layers.

Tapered Recessed High-Moment Wrap-Around Shield Layer

Figure 3:
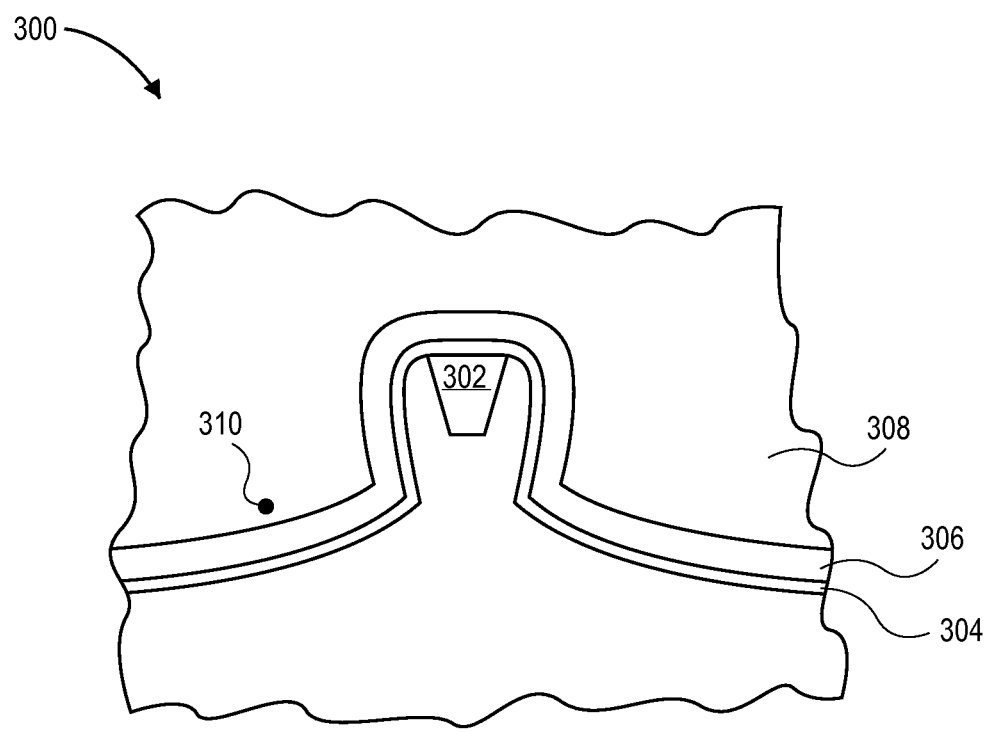
FIG. 3 is an air bearing surface (ABS) view of a conventional wrap-around shield (WAS) structure.

FIG. 3 is an air bearing surface (ABS) view of a conventional wrap-around shield (WAS) structure. FIG. 3 illustrates a portion of a magnetic write head 300, which comprises a magnetic pole tip 302 of a main pole (e.g., main pole 231 of FIG. 2). The pole tip 302 is wrapped by a WAS structure comprising a relatively thin high magnetic moment material layer 306 (also referred to simply as the "high-moment layer" and the "high-moment portion" as it may comprise multiple thin layers or films) and some bulk low magnetic moment material 308 (also referred to simply as "low moment portion"). The high-moment portion 306 has a higher magnetic moment than the low-moment portion 308. A thin layer 304 of magnetic insulating/isolating material, such as Ru, separates the pole tip 302 from the WAS structure. The remaining material under the isolating layer is primarily filler, such as alumina. As mentioned, a WAS is used to "catch" and redirect flux leakage from the main pole and pole tip 302 to the return pole (e.g., return pole 233 of FIG. 2), and is constructed of magnetic materials having a lower magnetic moment than the main pole material so that the WAS materials are less likely to generate their own magnetic flux from the excitation of the main pole.

Note that the layer 304, high-moment portion 306, and low-moment portion 308 not only wrap around a significant portion of the pole tip 302 surfaces, but also flare in both lateral (cross-track) directions for some distance away from the pole tip 302 area. Such a configuration is mainly a result of attempting to limit the complexity of some of the thin film manufacturing processes used to fabricate a magnetic write head such as write head 300. However, manufacturing simplicity comes at the expense of FTI in this context. It has been found that FTI "hot spots" are created away from the pole tip 302 close to the high-moment layer 306, for example, near a location 310.

Figure 4A:
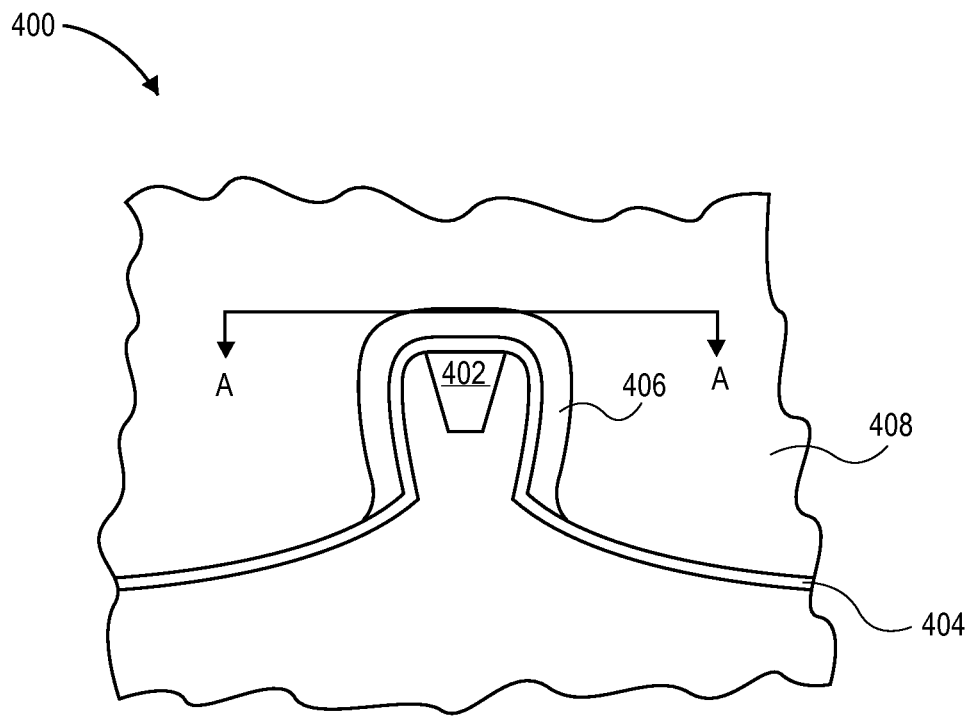
FIG. 4A is an ABS view of a recessed WAS structure, according to an embodiment of the invention.

FIG. 4A is an ABS view of a recessed WAS structure, according to an embodiment of the invention. FIG. 4A illustrates a portion of a magnetic write head 400, which comprises a magnetic pole tip 402 of a main pole (e.g., main pole 231 of FIG. 2). The pole tip 402 is wrapped by a WAS structure comprising a relatively thin (e.g., but not limiting, approximately 50-100 nm) high magnetic moment material layer 406 (also referred to simply as the "high-moment layer" and the "high-moment portion" as it may comprise multiple thin layers or films) and some bulk low magnetic moment material 408 (also referred to simply as "low moment portion"). The high-moment portion 406 has a higher magnetic moment than the low-moment portion 408, and is typically positioned closer to the pole tip 402 than the low-moment portion 408 to enable a sharp magnetic recording field gradient or pulse. A thin layer 404 of magnetic insulating/isolating material, such as Ru, separates the pole tip 402 from the WAS structure. The remaining material under the isolating layer is primarily filler, such as alumina.

With further reference to FIG. 4A, according to an embodiment, the WAS is configured such that at least a portion of high-moment portion 406 is recessed from the air bearing surface. Thus, being an ABS view, FIG. 4A illustrates the absence of high-moment layer 406 along the lateral flares of the WAS structure because the high-moment portion 406 is recessed from the ABS in these regions. Generally, high-moment WAS material is functionally most effective at the trailing edge (the top side of the pole tip 402 as depicted in FIG. 4A) to improve the magnetic recording field gradient and thus better track SER, and secondarily at the sides of the pole tip 402 to improve side-field gradient which well defines the edges of the track. Therefore, removing or foregoing the deposition of the high-moment portion 406 in areas beyond the trailing edge and possibly the sides of the pole tip does not significantly degrade the WAS function, but provides a counteraction to the FTI risk.

Figure 4B:
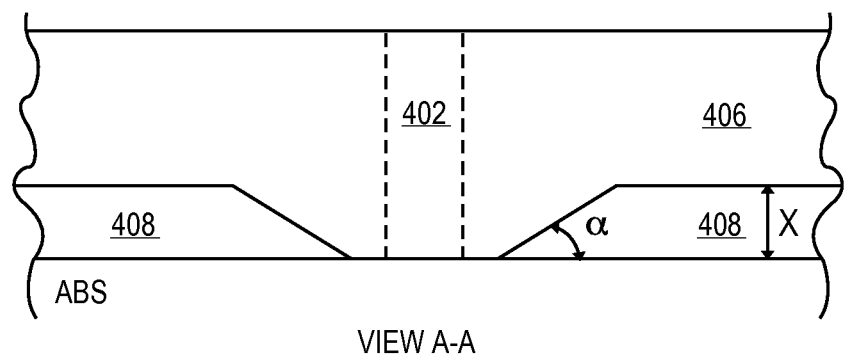
FIG. 4B is a top view of a recessed WAS structure, according to an embodiment of the invention.

FIG. 4B is a top view of a recessed WAS structure according to an embodiment of the invention, such as the recessed WAS structure of magnetic write head 400 along line A-A of FIG. 4A. Visible in this top view A-A of the WAS structure are the low-moment portion 408, extending to the ABS and along the surface of the ABS, and the recessed high-moment portion 406 covering the top of the pole tip 402 of the main pole. The recessed high-moment portion 406 is depicted extending a small distance laterally beyond the pole tip 402, consistent with its width depicted in FIG. 4A, and tapering away from the ABS starting around the area at which high-moment portion 406 meets with the layer 404 (FIG. 4A).

With the conventional write head 300 of FIG. 3, it was noted that each of layer 304, high-moment portion 306, and low-moment portion 308 flare in both lateral (cross-track) directions for some distance away from the pole tip 302 area, and that research has determined that FTI "hot spots" are created away from the pole tip 302 close to the high-moment layer 306, for example, near location 310. Returning to FIG. 4A, according to an embodiment, the WAS is configured such that at least a portion of high-moment portion 406 is recessed from the air bearing surface. For example, a different mask may be used to fabricate high-moment portion 406 than would be used to fabricate high-moment portion 306. Thus, being an ABS view, FIG. 4A illustrates the absence of high-moment layer 406 along the lateral flares of the WAS structure because the high-moment portion 406 is recessed from the ABS in these regions. Consequently, the FTI hot spots generated in the magnetic write head 300 are likely reduced or eliminated in the magnetic write head 400 of the present embodiment.

With further reference to FIG. 4B, high-moment portion 406 tapers away from the ABS in the cross-track direction away from the pole tip 402, to a distance X from the ABS, from where the high-moment portion 402 continues in the cross-track direction substantially parallel to the ABS. The exact configuration and dimensions associated with the taper portion and the ultimate cross-track portion of high-moment portion 406 may vary from implementation to implementation depending, for example, on the design of the main pole, pole tip, drive coil and magnetic write head, generally. However, for example and according to an embodiment, research and development has determined that a reasonable and functional configuration to comprise an ultimate recess distance X of approximately 100 nm from the ABS and a taper angle α of approximately 30°-45°, to be sufficient to effectively eliminate the FTI risk. Furthermore, the present embodiment for a recessed WAS high-moment portion may be implemented using a dry-pole fabrication process and/or the snore complex Damascene fabrication process.

Complete Recessed High-Moment Wrap-Around Shield Layer

Figure 5:
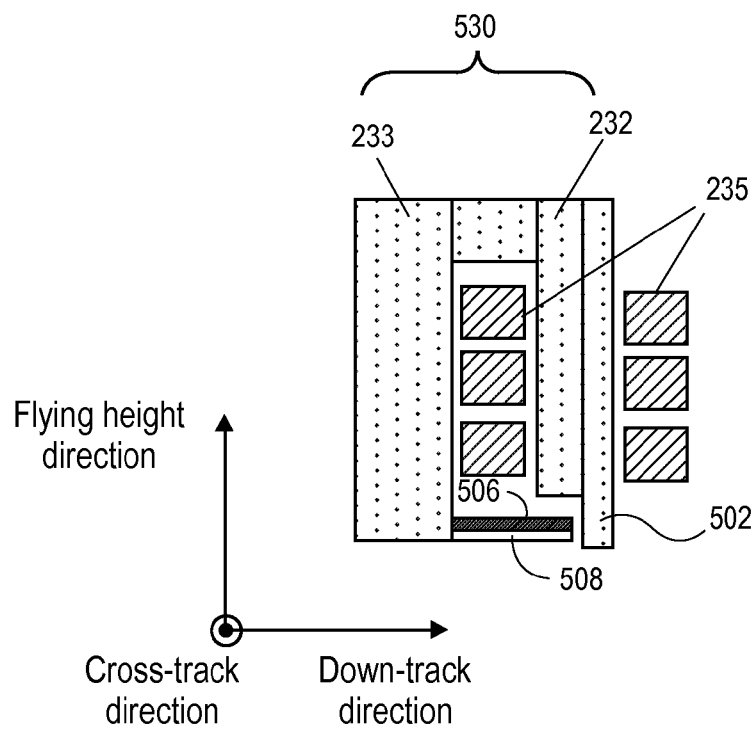
FIG. 5 is a cross-sectional side view of a recessed WAS structure, according to an embodiment of the invention.

FIG. 5 is a cross-sectional side of a recessed WAS structure, according to an embodiment of the invention. FIG. 5 illustrates a magnetic write head comprising a writer 530. The write head depicted in FIG. 5 is largely similar to the head 200 depicted in FIG. 2, with some notable differences as follows. Like elements are labeled with the same element numbers as in FIG. 2 and for purposes of clarity the associated descriptions of these elements are not repeated here. Reference is made to the description of FIG. 2 for such descriptions.

The write head of FIG. 5 comprises a main pole 502 wrapped by a WAS structure comprising a low-moment portion 508 and a recessed high-moment portion 506. In contrast to the write head 400 illustrated in FIGS. 4A and 4B, the high-moment portion 506 of the write head illustrated in the embodiment of FIG. 5 is completely and entirely recessed from the ABS, with the low-moment portion 508 being flush with the ABS and in front of the high-moment portion 506. This embodiment extends the idea of recessing the high-moment portion of the WAS away from the ABS by adding additional layers of high-moment portion 506, all of which are entirely recessed from the ABS. The additional high-moment layers improve the ability of the WAS structure to carry away the stray magnetic flux from the main pole without leaking it to the ABS. The plurality of high-moment layers of high-moment portion 506 are constructed essentially as a high-moment monolith or tower recessed from the ABS and deposited in layers in a direction leading away from the pole tip trailing edge side.

Laminated Recessed Wrap-Around Shield Layers

Figure 6:
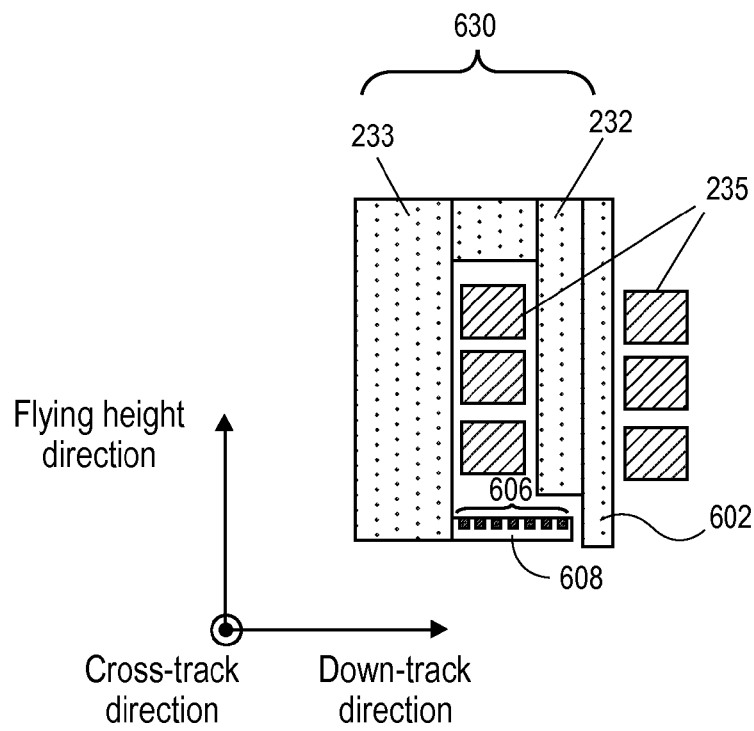
FIG. 6 is a cross-sectional side view of a recessed laminated WAS structure, according to an embodiment of the invention.

FIG. 6 is a cross-sectional side view of a recessed laminated WAS structure, according to an embodiment of the invention. FIG. 6 illustrates a magnetic write head comprising a writer 630. The write head depicted in FIG. 6 is largely similar to the head 200 depicted in FIG. 2, with some notable differences as follows. Like elements are labeled with the same element numbers as in FIG. 2 and for purposes of clarity the associated descriptions of these elements are not repeated here. Reference is made to the description of FIG. 2 for such descriptions.

The write head of FIG. 6 comprises a main pole 602 wrapped by a WAS structure comprising a low-moment portion 608 and a recessed high-moment portion 606. In contrast to the write head 400 illustrated in FIGS. 4A and 4B, the high-moment portion 606 of the write head illustrated in the embodiment of FIG. 6 is completely and entirely recessed from the ABS, with the low-moment portion 608 being flush with the ABS and in front of the high-moment portion 606. This embodiment extends the idea of recessing the high-moment portion of the WAS away from the ABS by adding additional layers of high-moment portion 606, all of which are entirely recessed from the ABS. The high-moment layers of high-moment portion 606 are configured in a laminate structure with low-moment layers of low-moment portion 608. The additional high-moment layers improve the ability of the WAS structure to carry away the stray magnetic flux without leaking it to the ABS, and the laminated low-moment layers serve generally as filler. According to a related embodiment, layers corresponding to the high-moment portion 606 and layers corresponding to the low-moment portion 608 are deposited in a laminate structure having alternating high-moment and low-moment portions in a direction leading away from the trailing edge side of the pole tip.

The foregoing embodiments for completely recessed WAS high-moment portions may be implemented using a dry-pole fabrication process and/or the more complex Damascene fabrication process.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A magnetic write head comprising:
    a magnetic write pole extending to an air bearing surface; and
    a wrap-around shield wrapping around a portion of said write pole, said wrap-around shield comprising:
        a high-moment portion having one or more face facing the direction of said air bearing surface and at least one of said one or more face recessed from said air bearing surface, and
        a low-moment portion having at least a portion flush with said air bearing surface.

2. The magnetic write head of claim 1,
    said wrap-around shield extending in a cross-track direction on each side of said write pole; and
    said high-moment portion tapering away from said air bearing surface in the cross-track direction away from said write pole.

3. The magnetic write head of claim 2,
    wherein said high-moment portion tapers away from said air bearing surface in the cross-track direction to approximately 100 nm from said air bearing surface, from where said high-moment portion is substantially parallel to said air bearing surface further in the cross-track direction.

4. The magnetic write head of claim 1, wherein said high-moment portion is entirely recessed from said air bearing surface.

5. The magnetic write head of claim 4, said write pole comprising a pole tip having a trailing edge side; and
    wherein said high-moment portion is positioned as a tower of high-moment layers deposited in a direction leading away from said trailing edge side of said pole tip and substantially parallel to said air bearing surface.

6. The magnetic write head of claim 4, said write pole comprising a pole tip having a trailing edge side; and
    wherein said high-moment portion and said low-moment portion are configured in a laminate structure in a direction leading away from said trailing edge side of said pole tip.

7. The magnetic write head of claim 4, said write pole comprising a pole tip having a trailing edge side; and
    wherein said high-moment portion and said low-moment portion are configured in a laminate structure having alternating high-moment and low-moment portions in a direction leading away from said trailing edge side of said pole tip.

8. The magnetic write head of claim 1,
    said magnetic write pole comprising a pole tip having a plurality of surfaces substantially perpendicular to said air bearing surface; and said wrap-around shield wrapping around only a portion of said plurality of surfaces where they meet with said air bearing surface.

9. The magnetic write head of claim 1,
said magnetic write pole comprising a trapezoidal-shaped pole tip comprising a trailing edge side, a leading edge side and two cross-track sides; and
said wrap-around shield wrapping around only said trailing edge side and said cross-track sides at said air bearing surface.

10. A magnetic write head comprising:
a magnetic write pole extending to an air bearing surface; and
a wrap-around shield wrapping around a portion of said write pole, comprising;
  a high-moment portion having a face facing said air bearing surface, said face recessed from said air bearing surface, and
  a low-moment portion having at least a portion flush with said air bearing surface.

11. The magnetic write head of claim 10, said write pole comprising a pole tip having a trailing edge side; and
wherein said high-moment portion and said low-moment portion are configured in a laminate structure in a direction leading away from said trailing edge side of said pole tip.

12. The magnetic write head of claim 10, said write pole comprising a pole tip having a trailing edge side; and
wherein said high-moment portion is configured monolithically in a direction leading away from said trailing edge side of said pole tip.

13. The magnetic write head of claim 10,
said wrap-around shield extending in a cross-track direction on each side of said write pole; and
said high-moment portion tapering away from said air bearing surface in the cross-track direction away from said write pole.

14. The magnetic write head of claim 13,
wherein said high-moment portion tapers away from said air bearing surface in the cross-track direction to approximately 100 nm from said air bearing surface, from where said high-moment portion is substantially parallel to said air bearing surface further in the cross-track direction.

15. A hard disk drive, comprising:
a head slider comprising a magnetic write head, said write head comprising:
  a magnetic write pole extending to an air bearing surface, and
  a wrap-around shield wrapping around a portion of said write pole, said wrap-around shield comprising:
    a high-moment portion having one or more face facing the direction of said air bearing surface and at least one of said one or more face recessed from said air bearing surface, and
    a low-moment portion having at least a portion flush with said air bearing surface;
a magnetic-recording disk rotatably mounted on a spindle; and
a voice coil motor configured to move the head slider to access portions of the magnetic-recording disk.

16. The hard disk drive of claim 15,
said wrap-around shield extending in a cross-track direction on each side of said write pole; and
said high-moment portion tapering away from said air bearing surface in the cross-track direction away from said write pole.

17. The hard disk drive of claim 16,
wherein said high-moment portion tapers away from said air bearing surface in the cross-track direction to approximately 100 nm from said air bearing surface, from where said high-moment portion is substantially parallel to said air bearing surface further in the cross-track direction.

18. The hard disk drive of claim 15, wherein said high-moment portion is entirely recessed from said air bearing surface.

19. The hard disk drive of claim 18, said write pole comprising a pole tip having a trailing edge side; and
wherein said high-moment portion is positioned as a tower of high-moment layers deposited in a direction leading away from said trailing edge side of said pole tip and substantially parallel to said air bearing surface.

20. The hard disk drive of claim 18, said write pole comprising a pole tip having a trailing edge side; and
wherein said high-moment portion and said low-moment portion are configured in a laminate structure in a direction away from said trailing edge side of said pole tip.

* * * * *